US007187929B2

(12) United States Patent
Obata et al.

(10) Patent No.: US 7,187,929 B2
(45) Date of Patent: Mar. 6, 2007

(54) RADIO LINK CONTROLLING APPARATUS, MOBILE COMMUNICATION SYSTEM, AND RADIO LINK CONTROLLING METHOD

(75) Inventors: Kazunori Obata, Yokosuka (JP); Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 454 days.

(21) Appl. No.: 10/345,419

(22) Filed: Jan. 16, 2003

(65) Prior Publication Data

US 2003/0139143 A1    Jul. 24, 2003

(30) Foreign Application Priority Data

Jan. 18, 2002    (JP)    .............................. 2002-010735

(51) Int. Cl.
*H04Q 7/20*    (2006.01)
*H04B 7/00*    (2006.01)

(52) U.S. Cl. ......................... 455/434; 455/522; 455/69

(58) Field of Classification Search ................ 455/434, 455/522, 69, 435.1, 435.2, 502, 515
See application file for complete search history.

(56) References Cited

U.S. PATENT DOCUMENTS

| 5,357,513 | A  |   | 10/1994 | Kay et al. |         |
|-----------|----|---|---------|------------|---------|
| 5,802,465 | A  | * | 9/1998  | Hamalainen et al. | 455/403 |
| 5,822,700 | A  | * | 10/1998 | Hult et al.  | 455/466 |
| 6,657,984 | B1 | * | 12/2003 | Semper     | 370/338 |
| 6,950,423 | B2 | * | 9/2005  | Kawakami et al. | 370/350 |

FOREIGN PATENT DOCUMENTS

| EP | 0 784 387 A2 | 7/1997 |
| EP | 1 170 974 A1 | 1/2002 |
| WO | WO 99/50977 | 10/1999 |
| WO | WO 00/77948 A1 | 12/2000 |

OTHER PUBLICATIONS

Universal Mobile Telecommunications System (UMTS); UTRAN Iub Interface User Plane Protocols for Common Transport Channel Data Streams (3GPP TS 25.435 version 3.8.0 Release 1999), ETSI TS 125 435 v3.8.0 (Sep. 2001) pp. 1-34.

* cited by examiner

*Primary Examiner*—Tilahun Gesesse
(74) *Attorney, Agent, or Firm*—Oblon, Spivak, McClelland, Maier & Neustadt, P.C.

(57) ABSTRACT

A radio link controlling apparatus configured to maintain communication quality at the time of setting a communication line. The radio link controlling apparatus includes a communication request receiving device for receiving a communication request including information about a service type, transmitted from a mobile terminal; a communication start timing determining device for determining communication start timing by the communication channel based on the information about the service type in the communication request received by the communication request receiving device; a control signal generating device for generating a control signal including the information of the communication start timing determined by the communication start timing determining device; and a control signal transmitting device for transmitting the control signal generated by the control signal generating device, to the mobile terminal by the control channel.

12 Claims, 7 Drawing Sheets

Fig.2

| Service Type | Activation Time |
|---|---|
| SINGLE CALL | A (ms) |
| MULTI-CALL | A+α (ms) |

RADIO LINK CONTROLLING APPARATUS, MOBILE COMMUNICATION SYSTEM, AND RADIO LINK CONTROLLING METHOD

BACKGROUND OF THE INVENTION

1. Field of the Invention

The present invention relates to a radio link controlling apparatus, a mobile communication system, and a radio link controlling method for communication with a mobile terminal by a control channel for transmission of a control signal and a communication channel for transmission of data.

2. Related Background Art

In the conventional mobile communication systems of cellular phones and others, communication was carried out between a mobile terminal and a base station by a control channel for transmission of a control signal and a communication channel for transmission of data, and this communication was controlled by a radio link controlling apparatus connected to the base station.

For starting communication in such mobile communication systems (at the time of setting of a communication line), the mobile terminal first transmitted a request signal for communication (communication request) to the radio link controlling apparatus by the control channel, and the radio link controlling apparatus receiving the communication request secured resources of a radio link in the base station and also secured transmission line resources in a wired network. Thereafter, the radio link controlling apparatus transmitted the radio link information to the mobile terminal by the control channel, and the mobile terminal switched the channel from the control channel to the communication channel on the basis of the radio link information.

SUMMARY OF THE INVENTION

In the mobile communication systems described above, the radio link information transmitted from the radio link controlling apparatus to the mobile terminal included information about timing for the mobile terminal to switch from the control channel to the communication channel, and the mobile terminal started communication by the communication channel on the basis of the radio link information thus received. The information about the timing in the radio link information is defined by a time until the start of communication at the mobile terminal, i.e., by "Activation Time." This Activation Time is determined in view of 1) a time for extracting information necessary for creation of a message of radio link information, to generate the message, 2) a time for transmitting the message to the mobile terminal, and 3) a time for the mobile terminal to receive the message of radio link information and monitor the communication channel designated. It was common practice in the conventional systems to fixedly set Activation Time.

Figure 7A:
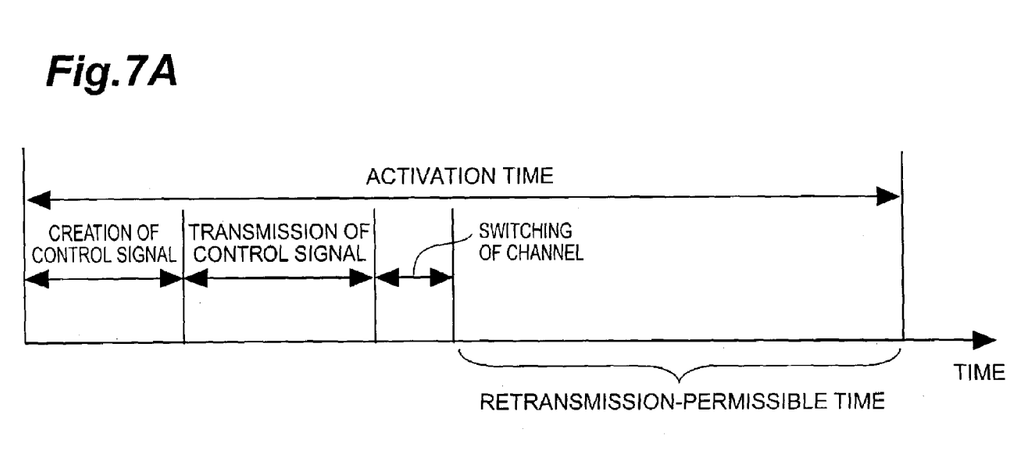
FIGS. 7A and 7B are diagrams for explaining the communication start timing.
Figure 7B:
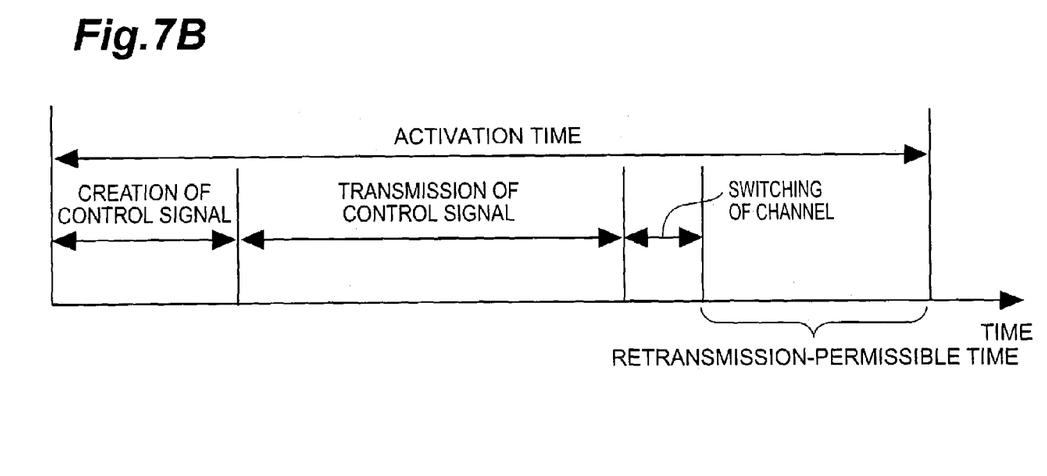

With advance in the mobile communication technology, however, in addition to the communication using one channel, for example, a communication method of simultaneously performing communication of sound and data by two channels has recently been developed. In this communication method, message lengths of control signals (radio link information) transmitted from the radio link controlling apparatus to the mobile terminal are different from each other, and the fixed determination of communication start timing can pose a problem that quality degrades at the time of setting a radio link. This will be described below with reference to FIGS. 7A and 7B. Normally, Activation Time is set with a margin enough to retransmit the control signal, as shown in FIG. 7A. However, assuming that FIG. 7A shows the communication start timing in the case of a single call, the control signal in the case of a multi-call with a longer message thereof takes a more time for transmission than the control signal of the single call, and thus there remains a time insufficient to retransmit the control signal, as shown in FIG. 7B. In this case, for example, one transmission failure will result in failure in transmission of the control signal and cause degradation of communication quality.

An object of the present invention is, therefore, to solve the above problem and, thereby, provide a radio link controlling apparatus, a mobile communication system, and a radio link controlling method capable of maintaining the communication quality at the time of setting of the communication line.

A radio link controlling apparatus according to the present invention is a radio link controlling apparatus for carrying out communication with a mobile terminal by a control channel for transmission of a control signal and a communication channel for transmission of data, the apparatus comprising: communication request receiving means for receiving a communication request including information about a service type, transmitted from the mobile terminal; communication start timing determining means for determining communication start timing by the communication channel on the basis of the information about the service type in the communication request received by the communication request receiving means; control signal generating means for generating a control signal including information of the communication start timing determined by the communication start timing determining means; and control signal transmitting means for transmitting the control signal generated by the control signal generating means, to the mobile terminal by the control channel.

The control signals (radio link information) transmitted from the radio link controlling apparatus to the mobile terminal at the time of starting communication are different depending upon service types included in respective communication requests. In the radio link controlling apparatus according to the present invention, the transmission times of the control signals are preliminarily estimated from message lengths of the control signals according to the respective service types, and the communication start timing enough to surely transmit each control signal is determined on the basis of the corresponding transmission time. Specifically, the communication start timing is determined in view of a state of the radio link and others, and it can be set to such timing as to permit at least one retransmission of the control signal. Then the communication start timing determining means selects and determines the communication start timing on the basis of the service type included in the communication request. This permits appropriate communication start timing to be determined for each service type, and the control signal can be surely transmitted independently of the message length of the control signal, whereby the communication quality can be maintained at the time of the start of communication. The term "communication request" herein embraces a request for communication connection transmitted from the mobile terminal at the originating/terminating time, and also embraces a request for change in the communication speed, a call addition request for addition of a communication channel, etc., and the present invention also covers cases where communication is started according to such requests. The "service types" include types of single calls and multi-calls determined by the number of channels for communication, and also include types indicating whether calls are sound communication or data communication.

Communication speeds depending upon communication channels are also included in the service types. Since the information on the communication speed of the communication channel is also included in the control signal, the message length of the control signal varies depending upon change in the information on the communication speed. Accordingly, it is much preferable to determine the communication start timing on the basis of the communication speed of the communication channel.

Another radio link controlling apparatus according to the present invention is a radio link controlling apparatus for carrying out communication with a mobile terminal by a control channel for transmission of a control signal and a communication channel for transmission of data, the apparatus comprising: control signal generating means for generating a control signal including information of communication start timing by the communication channel of the mobile terminal; and control signal transmitting means for transmitting the control signal generated by the control signal generating means, to the mobile terminal by the control channel, wherein the information of the communication start timing in the control signal generated by the control signal generating means is determined on the basis of a length of the control signal.

Since the transmission time of the control signal varies depending upon the length of the control signal, the communication start timing enough to surely transmit the control signal can be set by determining the information of the communication start timing in the control signal on the basis of the length of the control signal generated by the control signal generating means. Specifically, the communication start timing is determined in view of a state of the radio link or the like, and it can be set to such timing as to permit at least one retransmission of the control signal, for example. This permits the communication quality of the control signal transmitted from the radio link controlling apparatus to the mobile terminal, to be maintained independently of the message length of the control signal. The information of the communication start timing based on the length of the control signal can be included in the control signal on the occasion of generating the control signal by the control signal generating means, in such a way that the length of information of the communication start timing is preliminarily determined, the total message length of the control signal is calculated by summing up the message length of the other part of the control signal and the length of the information of the communication start timing, and the communication start timing is calculated from the total message length of the control signal and is included in the control signal. According to the present invention, the information of the communication start timing included in the control signal generated in cases of change in the communication speed and addition of a communication channel from the radio link controlling apparatus side can also be determined based on the message length of the control signal.

The above radio link controlling apparatus may be configured to further comprise communication request receiving means for receiving a communication request transmitted from the mobile terminal, and configured in a configuration wherein the control signal generating means generates the control signal on the basis of the communication request received by the communication request receiving means.

It is preferable to generate the control signal according to the information of the service type or the like included in the communication request, on the basis of the communication request transmitted from the mobile terminal.

A mobile communication system according to the present invention is a mobile communication system for carrying out communication by a control channel for transmission of a control signal and a communication channel for transmission of data, the system comprising: the above radio link controlling apparatus; and a mobile terminal for switching from the control channel to the communication channel to start communication in accordance with the information of the communication start timing in the control signal transmitted from the radio link controlling apparatus by the control channel.

Since the radio link controlling apparatus determines the communication start timing on the basis of the service type or the message length of the control signal, communication is started according to the information of the communication timing included in the control signal transmitted from the radio link controlling apparatus, whereby the mobile communication system can be realized with satisfactory quality of communication of the control signal independently of the contents and length of the control signal.

A radio link controlling method according to the present invention is a radio link controlling method of starting communication by a communication channel in a mobile communication system for carrying out communication between a mobile terminal and a radio link controlling apparatus by a control channel for transmission of a control signal and the communication channel for transmission of data, the method comprising: a communication request transmitting step of transmitting a communication request including information about a service type, from the mobile terminal to the radio link controlling apparatus; a communication start timing determining step of determining communication start timing by the communication channel on the basis of the information about the service type in the communication request transmitted in the communication request transmitting step; a control signal generating step of generating a control signal including the information of the communication start timing determined in the communication start timing determining step; a control signal transmitting step of transmitting the control signal generated in the control signal generating step, from the radio link controlling apparatus to the mobile terminal by the control channel; and a channel switching step of switching a channel of the mobile terminal from the control channel to the communication channel in accordance with the information of the communication start timing in the control signal transmitted in the control signal transmitting step.

The control signals (radio link information) transmitted from the radio link controlling apparatus to the mobile terminal at the time of starting communication are different depending upon the service types included in the respective communication requests. In the radio link controlling method according to the present invention, the transmission times of the control signals are preliminarily estimated from message lengths of the control signals according to the respective service types, and the communication start timing enough to surely transmit each control signal is determined on the basis of the corresponding transmission time. Specifically, the communication start timing is determined in view of a state of the radio link and others, and it can be set to such timing as to permit at least one retransmission of the control signal. The communication start timing determining step is then to select and determine the communication start timing on the basis of the service type included in the communication request. This permits appropriate communication start timing to be determined for each service type, and the control signal can be surely transmitted independently of the message length of the control signal, whereby the communication quality can be maintained at the time of the start of communication. The term "communication request" herein embraces a request for communication connection transmitted from the mobile terminal at the originating/terminating time, and also embraces a request for change in the communication speed, a call addition request for addition of a communication channel, etc., and the present invention also covers cases where communication is started according to such requests.

In the above radio link controlling method, the information about the service type includes information about a communication speed by the communication channel.

Since the information of the communication speed of the communication channel is also included in the control signal, the message length of the control signal varies with change in the information of the communication speed. Accordingly, it is much preferable to determine the communication start timing on the basis of the communication speed of the communication channel.

Another radio link controlling method according to the present invention is a radio link controlling method of starting communication by a communication channel in a mobile communication system for carrying out communication between a mobile terminal and a radio link controlling apparatus by a control channel for transmission of a control signal and the communication channel for transmission of data, the method comprising: a control signal generating step of generating a control signal including information of communication start timing by the communication channel of the mobile terminal; a control signal transmitting step of transmitting the control signal generated in the control signal generating step, from the radio link controlling apparatus to the mobile terminal by the control channel; and a channel switching step of switching a channel of the mobile terminal from the control channel to the communication channel in accordance with the information of the communication start timing in the control signal transmitted in the control signal transmitting step, wherein the communication start timing in the control signal generated in the control signal generating step is determined on the basis of a length of the control signal.

Since the transmission time of the control signal varies depending upon the length of the control signal, the communication start timing enough to surely transmit the control signal can be set by determining the information of the communication start timing in the control signal on the basis of the length of the control signal generated. Specifically, the communication start timing is determined in view of a state of the radio link or the like, and it can be set to such timing as to permit at least one retransmission of the control signal, for example. This permits the communication quality of the control signal transmitted from the radio link controlling apparatus to the mobile terminal, to be maintained independently of the message length of the control signal. The information of the communication start timing based on the length of the control signal can be included in the control signal on the occasion of generating the control signal in the control signal generating step, in such a way that the length of information of the communication start timing is preliminarily determined, the total message length of the control signal is calculated by summing up the message length of the other part of the control signal and the length of the information of the communication start timing, and the communication start timing is calculated from the total message length of the control signal and is included in the control signal. According to the present invention, the information of the communication start timing included in the control signal generated in cases of change in the communication speed and addition of a communication channel from the radio link controlling apparatus side can also be determined based on the message length of the control signal.

The above radio link controlling method may also be configured to further comprise a communication request transmitting step of transmitting a communication request from the mobile terminal to the radio link controlling apparatus, and configured so that the control signal generating step is to generate the control signal on the basis of the communication request transmitted in the communication request transmitting step.

It is preferable to generate the control signal according to the information of the service type or the like included in the communication request, on the basis of the communication request transmitted from the mobile terminal.

DETAILED DESCRIPTION OF THE PREFERRED EMBODIMENTS

The preferred embodiments of the mobile communication system according to the present invention will be described below in detail with reference to the drawings. The same elements will be denoted by the same reference symbols throughout the description of the drawings, and redundant description will be omitted.

Figure 1:
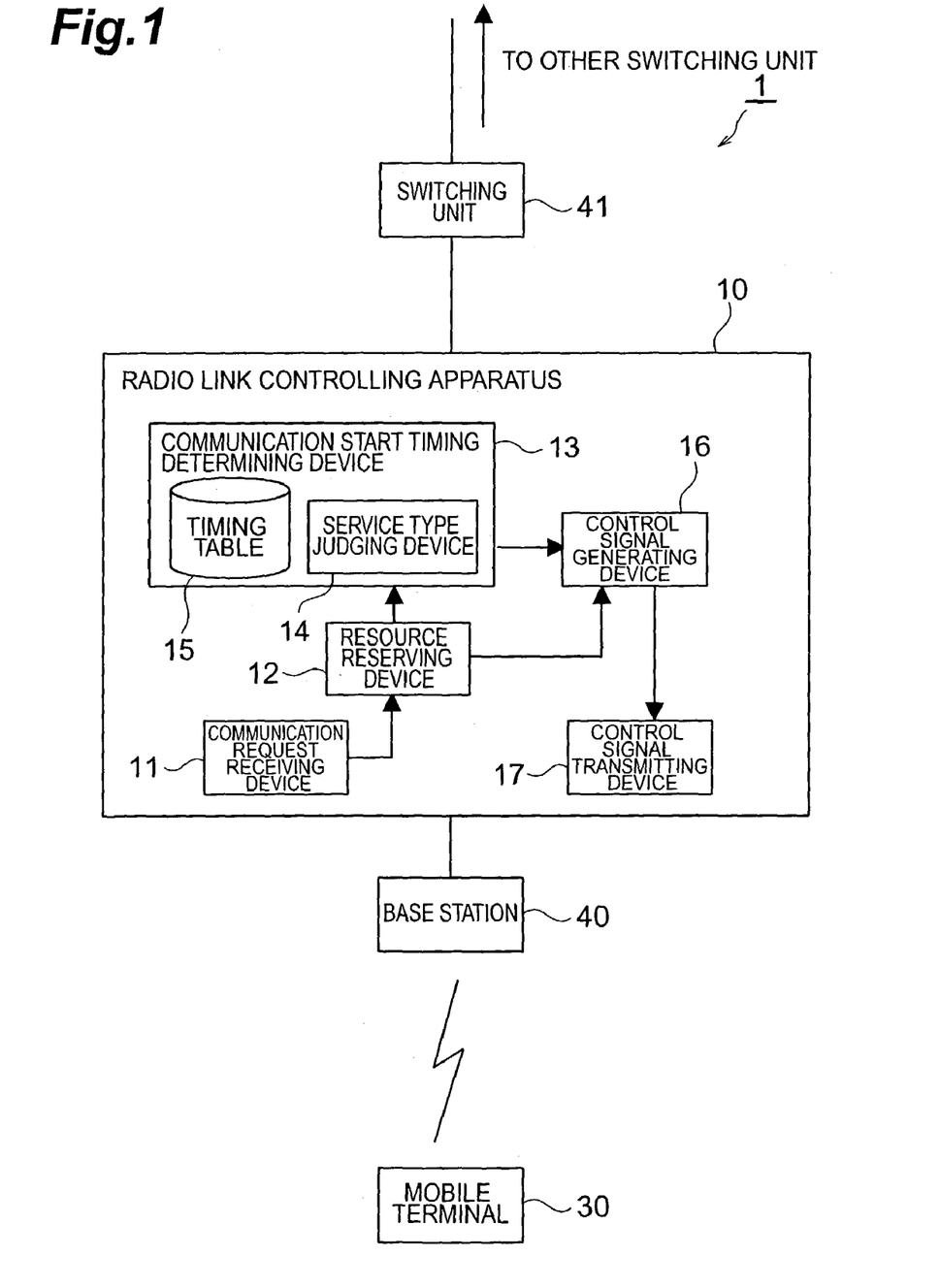
FIG. 1 is a block diagram showing the configuration of the mobile communication system according to the first embodiment.

FIG. 1 is a block diagram showing a configuration of mobile communication system 1 according to the first embodiment of the present invention. The mobile communication system 1 has a mobile terminal 30, a base station 40 to carry out communication with the mobile terminal 30, a radio link controlling apparatus 10 connected to the base station 40, and a switching unit 41.

The radio link controlling apparatus 10 has a communication request receiving device 11 for receiving a communication request transmitted from the mobile terminal 30 through the base station 40; a resource reserving device 12 for reserving wire and wireless resources according to the communication request; a communication start timing determining device 13 for determining communication start timing; a control signal generating device 16 for generating a control signal of radio link information at the time of starting communication; and a communication signal transmitting device 17 for transmitting the control signal generated by the control signal generating device 16.

The communication request receiving device 11 has a function of receiving the communication request transmitted from the mobile terminal 30. The communication request herein includes the information of the service type requested by the mobile terminal 30. The service type is information about communication between the mobile terminal 30 and the base station 40 and, for example, includes information on whether a multi-call or a single call, information on the communication speed, and so on.

The resource reserving device 12 has a function of reserving resources of a wire transmission line and a radio link when the communication request receiving device 11 receives the transmission request. When the wire and wireless resources are successfully reserved, the resource reserving device 12 notifies the control signal generating device 16 of the success through the communication start timing determining device 13. When the resource reserving device 12 fails to reserve the resources, it notifies the control signal generating device 16 of the failure.

Figure 2:
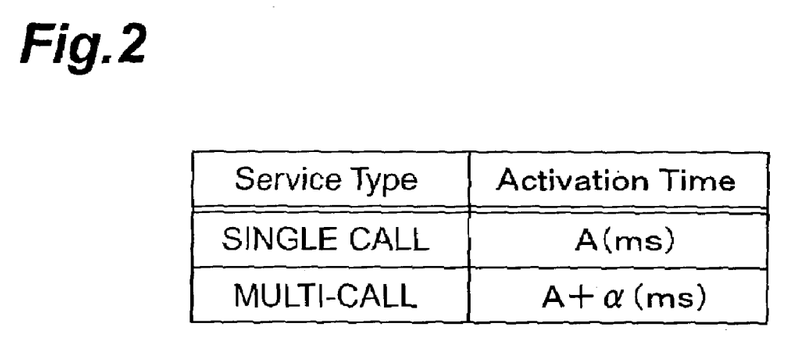
FIG. 2 is a diagram showing an example of data stored in the timing table.

The communication start timing determining device 13 has a service type judging device 14 and a timing table 15. The service type judging device 14 checks the service type included in the communication request received by the communication request receiving device 11 and judges whether the communication requested by the mobile terminal 30 is a single call for communication by one communication channel or a multi-call for communication by two or more communication channels. The timing table 15 stores data of Activation Times according to respective service types. The reason why Activation Times are stored as the information of the communication start timing is that the communication starting timing can be defined by a time until a start of communication, i.e., by Activation Time. The reason why correspondence is made between service types and Activation Times is that the message lengths of the control signals are basically determined by the service types and that it is preferable to determine the communication start timing by the message lengths of the control signals in terms of maintaining the communication quality of the control signals. FIG. 2 is a diagram showing an example of data stored in the timing table 15. In the present embodiment, as shown in FIG. 2, Activation Time is A (ms) in the case of the service type being a single call, while Activation Time is A+α (ms) in the case of the service type being a multi-call. The communication start timing determining device 13 has a function of determining Activation Time on the basis of the result of a judgment made on the service type by the service type judging device 14.

The control signal generating device 16 has a function of generating a control signal including the information of the communication start timing notified of by the communication start timing determining device 13. The other information in the control signal includes information of the communication speed, information of spreading codes of communication channels used in communication, and so on. The control signal generating device 16 has a function of generating a control signal indicating incapability of communication when the resource reserving device 12 fails to reserve the resources.

The control signal transmitting device 17 has a function of transmitting the control signal generated by the control signal generating device 16, to the base station 40 and a function of transmitting the control signal generated by the control signal generating device 16, to the mobile terminal 30 by the control channel.

Figure 3:
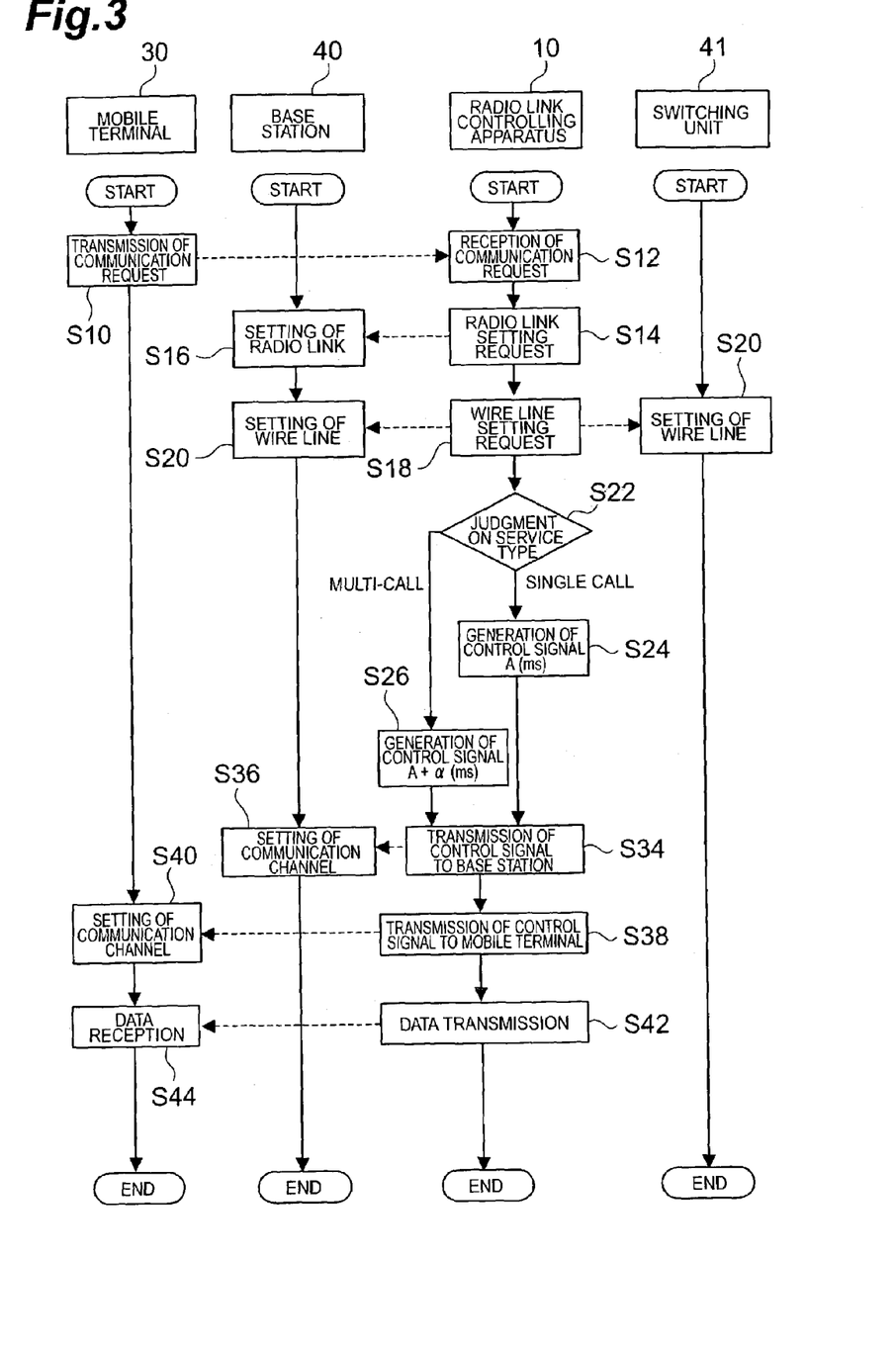
FIG. 3 is a flowchart showing the operation of the mobile communication system according to the first embodiment.

The following will describe the operation of the mobile communication system 1 according to the first embodiment and also describe the radio link controlling method according to the embodiment of the present invention. FIG. 3 is a flowchart showing the operation of the mobile communication system 1.

First, the mobile terminal 30 transmits a communication request through the base station 40 to the radio link controlling apparatus 10 (S10). The communication request includes the information about the service type. When the radio link controlling apparatus 10 receives the communication request transmitted from the mobile terminal 30 (S12), the resource reserving device 12 thereof transmits a request for setting of a radio link to the base station 40 (S14). Then the base station 40 receives the radio link setting request transmitted from the radio link controlling apparatus 10 and sets a radio link (S16). The resource reserving device 12 of the radio link controlling apparatus 10 also transmits a request for setting of a wire line to the base station 40 and to the switching unit 41 (S18), and the base station 40 and the switching unit 41 receive the wire line setting request transmitted from the radio link controlling apparatus 10 and set a wire line (S20). Although the flowchart shown in FIG. 3 illustrates only the case where the resources of the radio link and wire line are successfully reserved, the radio link controlling apparatus 10 generates a control signal of "line busy" and transmits it to the mobile terminal 30 when it fails to reserve the resources of radio link and wire line.

Thereafter, the radio link controlling apparatus 10 lets the service type judging device 14 judge the service type included in the communication request (S22). Then the communication start timing determining device 13 determines the communication start timing on the basis of the result of the judgment made by the service type judging device 14. The communication start timing determining device 13 notifies the control signal generating device 16 of the communication start timing thus determined.

Subsequently, the control signal generating device 16 generates a control signal of radio link information to be transmitted to the mobile terminal 30. On this occasion, the control signal generating device 16 generates the control signal including the information of the communication start timing notified of by the communication start timing determining device 13. Referring to the timing table 15 shown in FIG. 2, the control signal generated herein is one including such information that Activation Time is A (ms) as the communication start timing in the case of the service type being a single call (S24), whereas the control signal generated herein is one including such information that Activation Time is A+α (ms) as the communication start timing in the case of the service type being a multi-call (S26).

Then the control signal transmitting device 17 of the radio link controlling apparatus 10 transmits the control signal thus generated, to the base station 40 (S34). When the base station 40 receives the control signal transmitted from the radio link controlling apparatus 10, it sets a communication channel on the basis of the received control signal (S36) and switches the channel from the control channel to the communication channel on the basis of the information of the communication start timing.

Subsequently, the control signal transmitting device 17 of the radio link controlling apparatus 10 transmits the control signal generated, to the mobile terminal 30 (S38). When the mobile terminal 30 receives the control signal transmitted from the radio link controlling apparatus 10, it sets a communication channel on the basis of the control signal received (S40), and switches the reception channel from the control channel to the communication channel on the basis of the information of the communication start timing.

Finally, the radio link controlling apparatus 10 transmits data by the communication channel (S42), and the mobile terminal 30 receives the data transmitted from the radio link controlling apparatus 10 (S44).

In the mobile communication system 1 according to the first embodiment, the radio link controlling apparatus 10 has the communication start timing determining device 13, and the communication start timing determining device 13 determines the appropriate communication start timing based on the service type. Since the message lengths are basically determined by the respective service types, the communication start timing matching the message length of each control signal is determined by the simple means of determining the service type, whereby the communication quality at the time of the start of communication can be enhanced while securing the sufficient retransmission time of the control signal.

Since the radio link controlling method according to the first embodiment is arranged to determine the communication start timing on the basis of the service type and transmit the control signal including the information of the communication start timing thus determined, the communication start timing matching the message length of each control signal is determined by the simple method of determining the service type, whereby the communication quality at the time of the start of communication can be enhanced while securing the sufficient retransmission time of the control signal.

Figure 4:
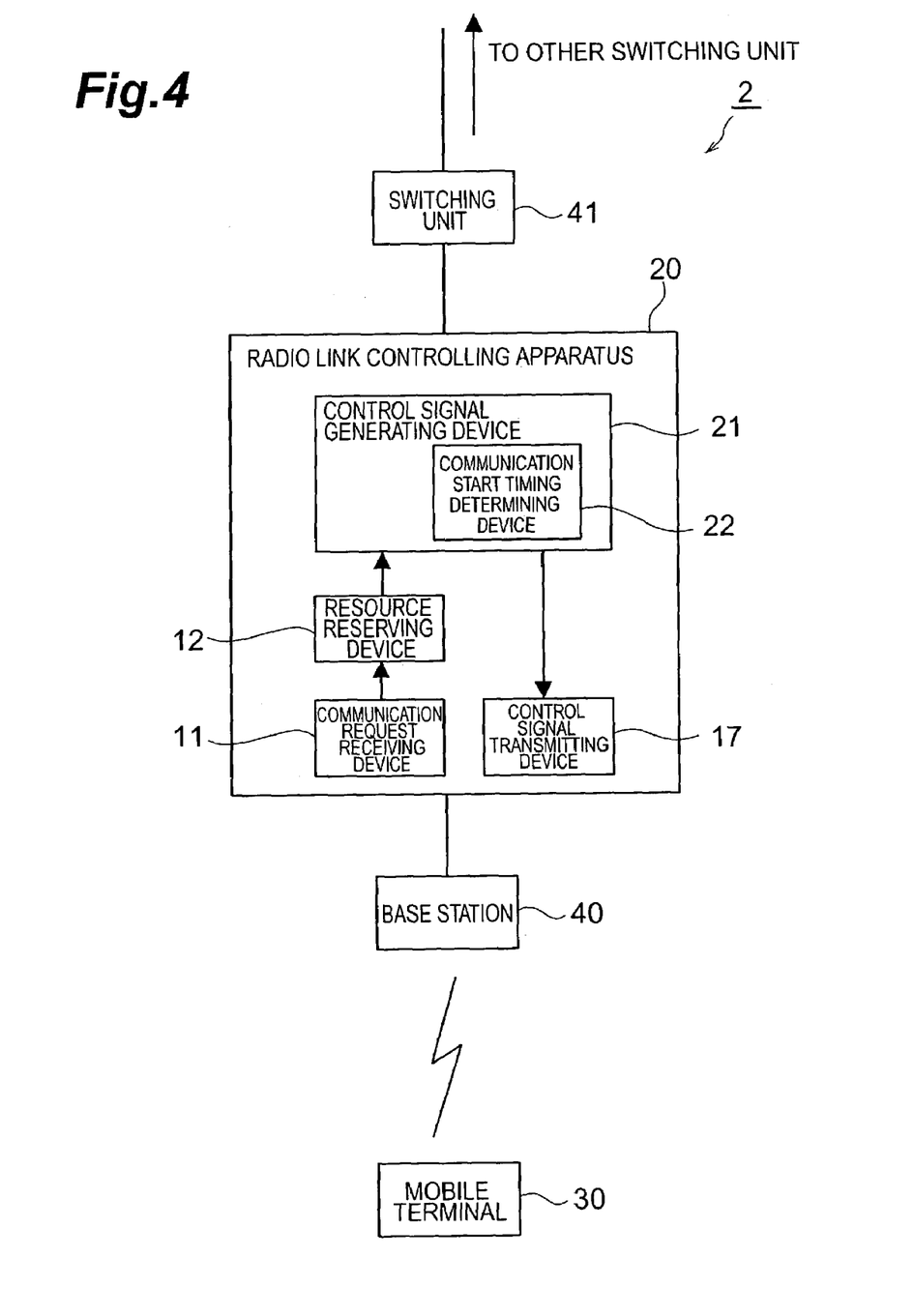
FIG. 4 is a block diagram showing the configuration of the mobile communication system according to the second embodiment.

The mobile communication system 2 according to the second embodiment of the present invention will be described below. FIG. 4 is a block diagram showing the configuration of mobile communication system 2 according to the second embodiment. The mobile communication system 2 of the second embodiment has the same basic configuration as the mobile communication system 1 of the first embodiment, but the mobile communication system 2 of the second embodiment is slightly different therefrom in the configuration of the radio link controlling apparatus 20.

The radio link controlling apparatus 20 according to the second embodiment has a communication request receiving device 11, a resource reserving device 12, a control signal generating device 21, and a control signal transmitting device 17, and the communication start timing determining device 22 is incorporated in the control signal generating device 21. The communication request receiving device 11, resource reserving device 12, and control signal transmitting device 17 have the same functions as the communication request receiving device 11, resource reserving device 12, and control signal transmitting device 17, respectively, in the first embodiment.

Figure 5A:
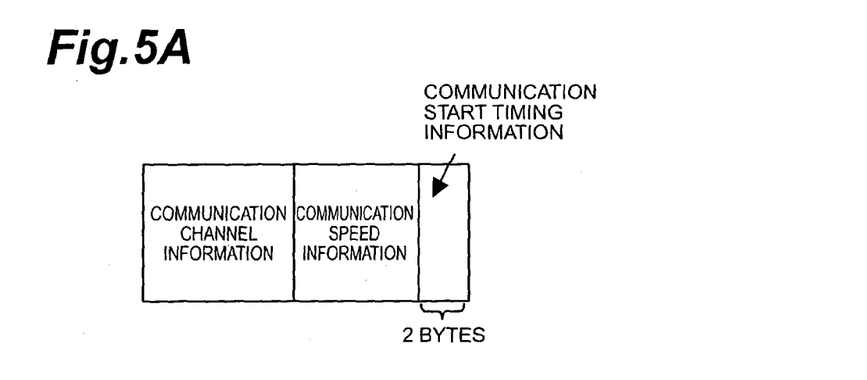
FIGS. 5A and 5B are diagrams showing examples of control signals generated by the control signal generating device.
Figure 5B:
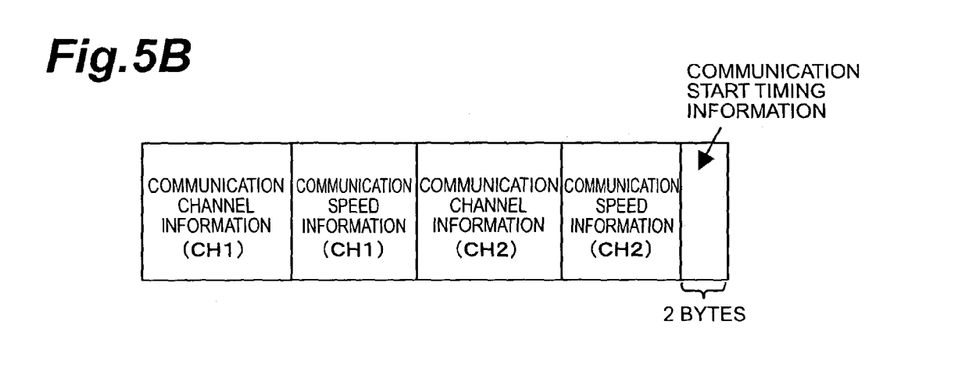

The control signal generating device 21 includes the communication start timing determining device 22 as described above. The communication start timing determining device 22 has a function of determining the communication start timing on the basis of the message length of the control signal generated by the control signal generating device 21. A method of generating the control signal including the information of the communication start timing by the control signal generating device 21 will be described below with reference to FIGS. 5A and 5B. FIGS. 5A and 5B are diagrams showing examples of control signals generated. The communication start timing is basically determined on the basis of the message length of each control signal, but the communication start timing cannot be determined before generation of the control signal, because the lengths of the control signals are not constant, as shown in FIGS. 5A and 5B. Thus, an area (2 bytes herein) for entry of the communication start timing information is first secured in the control signal. Then the control signal generating device 21 determines information of the communication channel and communication speed on the basis of the communication request to generate the control signal, and adds 2 bytes for the communication start timing information to the message length of those information to obtain the total message length of the control signal. Then the communication start timing is determined on the basis of the message length thus obtained, and the communication start timing information is put into the area secured in the control signal. In the examples shown in FIGS. 5A and 5B, the communication channel information and the communication speed information is illustrated as the information included in the control signal for convenience' sake of description, but the actual control signal also includes other information.

Figure 6:
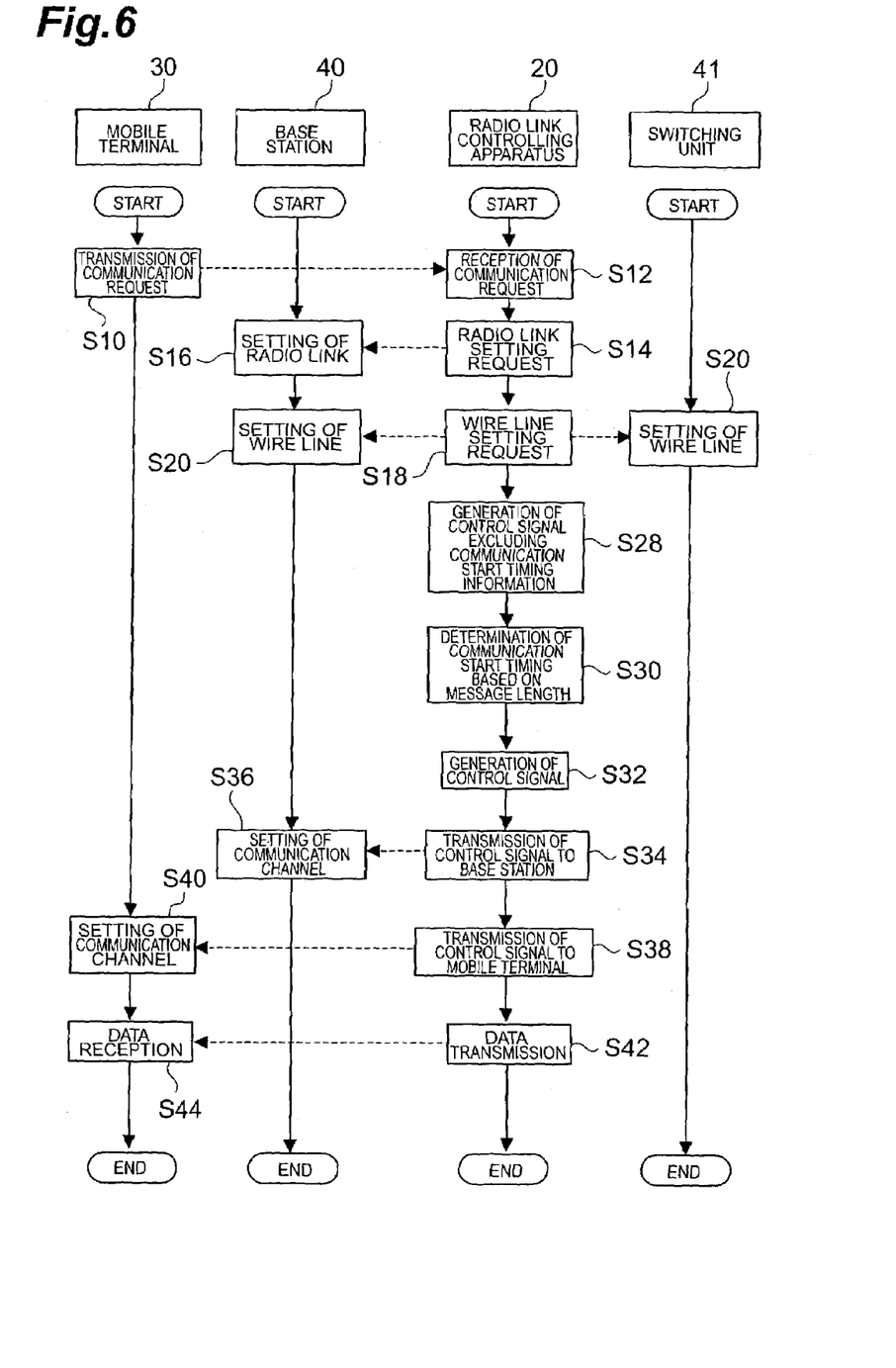
FIG. 6 is a flowchart showing the operation of the mobile communication system according to the second embodiment.

The following will describe the operation of the mobile communication system 2 according to the second embodiment and also describe the radio link controlling method according to the second embodiment. FIG. 6 is a flowchart showing the operation of the mobile communication system 2 according to the second embodiment.

First, the mobile terminal 30 transmits a communication request through the base station 40 to the radio link controlling apparatus 20 (S10). When the radio link controlling apparatus 20 receives the communication request transmitted from the mobile terminal 30 (S12), the resource reserving device 12 transmits a request for setting of a radio link to the base station 40 (S14). Then the base station 40 receives the radio link setting request transmitted from the radio link controlling apparatus 20 and sets a radio link (S16). The resource reserving device 12 of the radio link controlling apparatus 20 transmits a request for setting of a wire line to the base station 40 and to the switching unit 41 (S18), and the base station 40 and the switching unit 41 receive the wire line setting request transmitted from the radio link controlling apparatus 20 and set a wire line (S20). Although the flowchart shown in FIG. 6 illustrates only the case where the resources of the radio link and wire line are successfully reserved, the radio link controlling apparatus 20 generates a control signal of "line busy" and sends the signal to the mobile terminal 30 when it fails to reserve the resources of radio link and wire line.

Then the control signal generating device 21 of the radio link controlling apparatus 20 generates the control signal on the basis of the information included in the communication request, and other information (S28). On this occasion, for the information of the communication start timing, only an area for storage of the information is secured in the control signal. Then the communication start timing determining device 22 determines the communication start timing on the basis of the message length of the control signal generated by the control signal generating device 21 (S30). Specifically, the byte count of the area for storage of the information of communication start timing is added to the control signal generated by the control signal generating device 21 to obtain the total message length of the control signal, and the communication start timing is determined from the communication time or the like for transmission of the control signal on the basis of the message length of the control signal obtained. Subsequently, the control signal generating device 21 inserts the information of communication start timing determined by the communication start timing determining device 22, into the area secured in the control signal, to complete the control signal (S32), and feeds the control signal thus generated, to the control signal transmitting device 17.

Then the control signal transmitting device 17 of the radio link controlling apparatus 20 transmits the generated control signal to the base station 40 (S34). When the base station 40 receives the control signal transmitted from the radio link controlling apparatus 20, it sets a communication channel on the basis of the received control signal (S36) and switches the channel from the control channel to the communication channel on the basis of the information of communication start timing.

Subsequently, the control signal transmitting device 17 of the radio link controlling apparatus 20 transmits the control signal thus generated, to the mobile terminal 30 (S38). When the mobile terminal 30 receives the control signal transmitted from the radio link controlling apparatus 20 (S40), it sets a communication channel on the basis of the received control signal and switches the reception channel from the control channel to the communication channel on the basis of the information of communication start timing.

Finally, the radio link controlling apparatus 20 transmits data by the communication channel (S42), and the mobile terminal 30 receives the data transmitted from the radio link controlling apparatus 20 (S44).

The mobile communication system 2 of the second embodiment has the radio link controlling device 20 for determining the communication start timing on the basis of the message length of the control signal, and the communication start timing is determined based on the message length of the control signal so as to secure the sufficient retransmission time of the control signal, whereby the communication quality can be enhanced at the time of the communication start.

Since the radio link controlling method of the second embodiment is also arranged to determine the communication start timing on the basis of the message length of the control signal, the communication quality at the time of the start of communication can be enhanced by determining the communication start timing based on the message length of the control signal so as to secure the sufficient retransmission time of the control signal.

The above described the radio link controlling apparatus, mobile communication system, and radio link controlling method according to the present invention in detail with the embodiments thereof, but it is noted that the present invention is by no means intended to be limited to the above embodiments.

In the above first embodiment, the timing table 15 defines Activation Times corresponding to the types of calls indication whether a single call or a multi-call, but Activation Times may also be defined corresponding to the numbers of communication channels used. It is also possible to define Activation Times corresponding to other information of service types, for example, corresponding to communication speeds.

According to the present invention, the transmission time of the control signal is preliminarily estimated from the message length of the control signal for each service type, and the communication start timing enough to permit at least one retransmission of the control signal is determined on the basis of the transmission time. Then the communication start timing determining means selects and determines the communication start timing on the basis of the service type included in the communication request. This permits the appropriate communication start timing to be determined for each service type, and the control signal can be surely transmitted independently of the message length of the control signal, whereby the communication quality can be maintained at the time of the communication start.

According to the present invention, the information of communication start timing included in the control signal is determined on the basis of the length of the control signal generated, whereby the communication start timing can be determined so as to be able to surely transmit the control signal. This permits the communication quality of the control signal transmitted from the radio link controlling apparatus to the mobile terminal to be maintained independently of the message length of the control signal.

What is claimed is:

1. A radio link controlling apparatus for carrying out communication with a mobile terminal by (1) a control channel for transmission of a control signal, and (2) a communication channel for transmission of data, the apparatus comprising:

means for receiving a communication request, including information about a service type, transmitted from the mobile terminal;

means for determining communication start timing of the communication channel based on the information about the service type in the received communication request;

means for generating a control signal including the determined information of the communication start timing; and means for transmitting the generated control signal to the mobile terminal by the control channel.

2. The radio link controlling apparatus according to claim 1, wherein the information about the service type includes information about a communication speed by the communication channel.

3. A mobile communication system for carrying out communication by a control channel for transmission of a control signal and a communication channel for transmission of data, the system comprising:

the radio link controlling apparatus as set forth in claim 2; and a mobile terminal for switching from the control channel to the communication channel to start communication in accordance with the information of the communication start timing in the control signal transmitted from the radio link controlling apparatus by the control channel.

4. A mobile communication system for carrying out communication by a control channel for transmission of a control signal and a communication channel for transmission of data, the system comprising:

the radio link controlling apparatus as set forth in claim 1; and a mobile terminal for switching from the control channel to the communication channel to start communication in accordance with the information of the communication start timing in the control signal transmitted from the radio link controlling apparatus by the control channel.

5. A radio link controlling apparatus for carrying out communication with a mobile terminal by (1) a control channel for transmission of a control signal, and (2) a communication channel for transmission of data, the apparatus comprising:

means for generating a control signal, including information of communication start timing, by the communication channel of the mobile terminal; and means for transmitting the generated control signal to the mobile terminal by the control channel,
wherein the information of the communication start timing in the generated control signal is determined based on a length of the control signal.

6. The radio link controlling apparatus according to claim 5, further comprising:
means for receiving a communication request transmitted from the mobile terminal,
wherein said means for generating the control signal generates the control signal based on the received communication request.

7. A mobile communication system for carrying out communication by a control channel for transmission of a control signal and a communication channel for transmission of data, the system comprising:
the radio link controlling apparatus as set forth in claim 6; and
a mobile terminal for switching from the control channel to the communication channel to start communication in accordance with the information of the communication start timing in the control signal transmitted from the radio link controlling apparatus by the control channel.

8. A mobile communication system for carrying out communication by a control channel for transmission of a control signal and a communication channel for transmission of data, the system comprising:
the radio link controlling apparatus as set forth in claim 5; and
a mobile terminal for switching from the control channel to the communication channel to start communication in accordance with the information of the communication start timing in the control signal transmitted from the radio link controlling apparatus by the control channel.

9. A radio link controlling method of starting communication by a communication channel in a mobile communication system for carrying out communication between a mobile terminal and a radio link controlling apparatus by a control channel for transmission of a control signal and the communication channel for transmission of data, the method comprising:
transmitting a communication request including information about a service type, from the mobile terminal to the radio link controlling apparatus;
determining communication start timing by the communication channel based on the information about the service type in the transmitted communication request;
generating a control signal including the information of the communication start timing determined in the determining step;
transmitting the control signal generated in the generating step, from the radio link controlling apparatus to the mobile terminal by the control channel; and
switching a channel of the mobile terminal from the control channel to the communication channel in accordance with the information of the communication start timing in the transmitted control signal.

10. The radio link controlling method according to claim 9, wherein the information about the service type includes information about a communication speed by the communication channel.

11. A radio link controlling method of starting communication by a communication channel in a mobile communication system for carrying out communication between a mobile terminal and a radio link controlling apparatus, by a control channel for transmission of a control signal and the communication channel for transmission of data, the method comprising:
generating a control signal including information of communication start timing by the communication channel of the mobile terminal;
transmitting the generated control signal from the radio link controlling apparatus to the mobile terminal by the control channel; and
switching a channel of the mobile terminal from the control channel to the communication channel in accordance with the information of the communication start timing in the transmitted control signal,
wherein the communication start timing in the generated control signal is determined based on a length of the control signal.

12. The radio link controlling method according to claim 11, further comprising transmitting a communication request from the mobile terminal to the radio link controlling apparatus,
wherein said control signal generating step includes generating the control signal based on the transmitted communication request.

* * * * *